Sept. 6, 1927.
A. C. SAVIDGE
1,641,868
VALVE SEAT REAMER
Filed Nov. 22, 1920
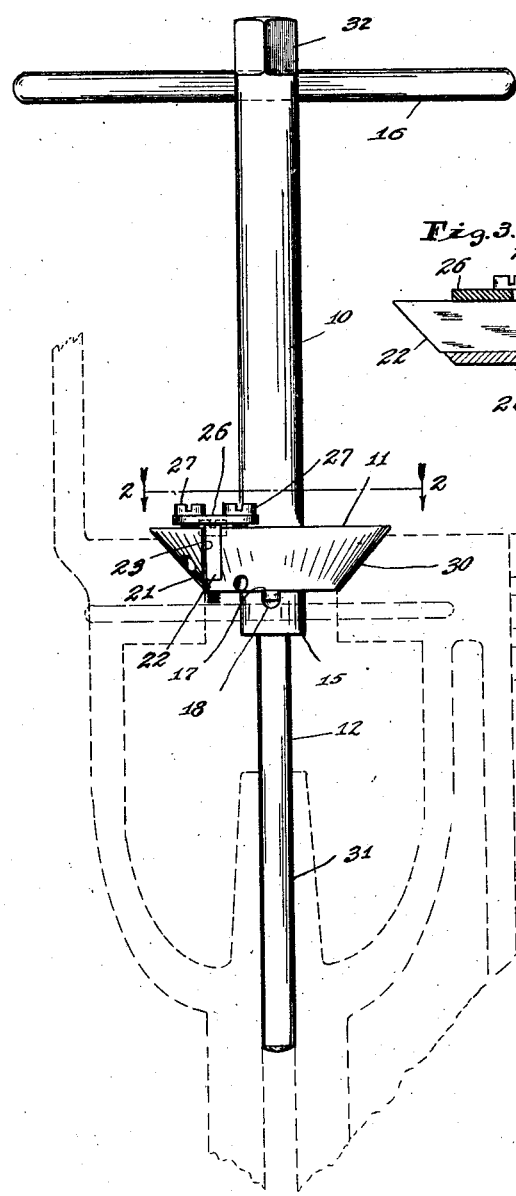
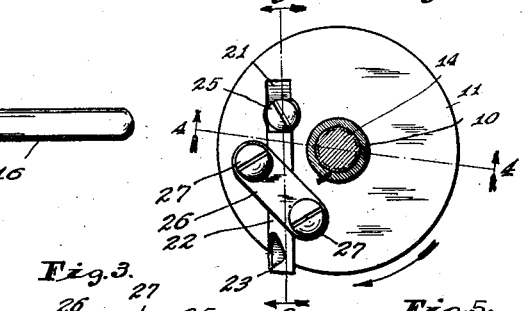
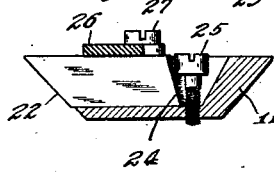
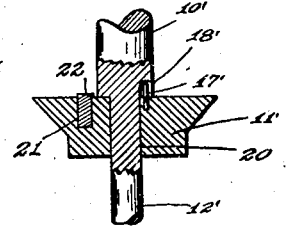
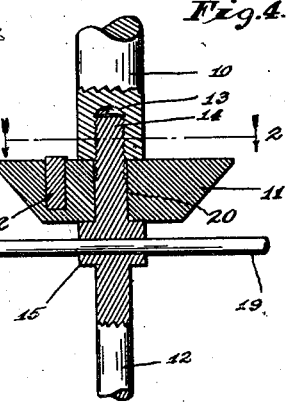
Inventor,
Albert C. Savidge
By Hood Ashley.
Attorneys Patented Sept. 6, 1927.

1,641,868

UNITED STATES PATENT OFFICE.

ALBERT C. SAVIDGE, OF INDIANAPOLIS, INDIANA.

VALVE-SEAT REAMER.

Application filed November 22, 1920. Serial No. 425,621.

It is the object of my invention to produce a simple and effective valve-seat reamer, which will be positive in its action, will operate without chattering, will tend to feed itself into the work so that the operator will be relieved of the necessity of exerting great feeding pressure in addition to turning pressure, will be readily adjustable for different depths of cut, will limit the depth of cut, and will permit the ready replacement of the working parts when they are worn too greatly, and which in its preferred form has a stem and a cutting head separable from each other and from an operating member so that a plurality of stems of different diameters and a plurality of cutting heads of different diameters and different tapers may be provided for association with each other in any desired combination as conditions require and for operation by the same operating member.

The accompanying drawing illustrates my invention: Fig. 1 is an elevation of a valve-seat reamer embodying my invention in its preferred form, indicating in dotted lines a fragment of an engine in which a valve seat is being reamed; Fig. 2 is a transverse section on the lines 2—2 of Figs. 1 and 4; Fig. 3 is a section on the line 3—3 of Fig. 2; Fig. 4 is a section on the line 4—4 of Fig. 2; and Fig. 5 is a section similar to Fig. 4, but showing a modified construction in which the stem is not interchangeable.

The valve-seat reamer consists of an operating shaft 10, a circular cutter head 11, and a guide stem 12. In the preferred form of my invention, these are all three separable from one another, the lower end of the operating shaft 10 being provided with a central threaded hole 13 into which the threaded upper end 14 of the guide stem 12 may be screwed to clamp the cutter head 11 between the lower end of the operating shaft 10 and a collar 15 on the guide stem 12 near its upper end, as is clear from Fig. 4. When the three parts 10, 11, and 2 are together, the device may be operated to ream out a valve seat by being turned by a cross bar 16 which passes transversely through the upper end of the operating shaft 10 and which may be slid into and out of place. The force of turning is transmitted from the shaft 10 and stem 12 to the cutter head 11 by a pin 17 provided on the cutter head 11 and projecting into a notch 18 in the collar 15 in the same manner as the pin 17' projects into the notch 18' in the construction shown in Fig. 5. By this construction, the reaction against the cutter head 11 when the shaft 10 is turned merely clamps the three parts 10, 11, and 12 more tightly together; and in order to facilitate disconnection when desired the collar 15 is provided with a transverse opening through it for removably receiving a cross pin 19 so that by the operation of the two cross pins 16 and 19 the parts may be unscrewed without any additional tools no matter how tightly clamped together.

With this construction, a number of cutter heads 11 and of guide stems 12 may be provided in a kit, the cutter heads being of different diameters and different tapers and the stems 11 being of different diameters to meet the usual conditions which are encountered in practice. Ordinarily, three stems and five or six cutters will take care of all the usual valve structures commonly met with. All the cutter heads have their central holes 20 of the same size, and all the guide stems have their upper ends 14 and collars 15 similar, to permit universal interchangeability among the parts.

Where this interchangeability is not desired, or even where interchangeability of stems is not desired, as for instance when the tool is to be used wholly on one size of work, such as Ford engines, the structure shown in Fig. 5 may be used, where the operating shaft 10' and guide stem 12' are made integral, and the cutter head 11' is put on the stem 12' with a tight fit; in which case the upper face of the cutter head is provided with a projecting pin 17' for projecting into a notch 18' in the shoulder formed at the lower end of the operating shaft 10' where such shaft joins the guide stem 12'.

The cutter head 11 or 11' preferably has flat upper and lower surfaces and a tapered periphery between such surfaces. This tapered periphery may extend to such upper and lower surfaces, as shown in Figs. 1, 3, and 4, or may stop short of one or both of them with a cylindrical surface between as indicated in Fig. 5. The cutter head is provided with a tool-receiving slot 21, for receiving a cutting tool 22. This slot 21 extends into the cutter head from the upper face nearly to the lower face, as is clear from Fig. 3, and at one end opens to the tapered periphery of the cutter head, and the cutting edge 23 of the cutting tool 22 is shaped to correspond to the taper of the periphery of the cutter head and to the taper of the valve seat. The cutting tool 22 has an inclined rear end 24, which cooperates with the head of an adjusting screw 25 mounted in the cutter head at the rear end of the slot 21 so that by screwing down such screw 25 the cutting tool 22 may be fed forward along the slot 21, as is clear from Fig. 3. The screw 25 also resists any tendency which may arise in use to force the cutting tool backward along the slot 21 by the reaction due to the reaming operation. The cutter 22 projects upward slightly beyond the upper face of the cutter head, so that it will be acted on by a clamping plate 26 which passes obliquely over it, which clamping plate 26 at its ends is provided with clamping screws 27 mounted in the cutter head 11 for clamping the clamping plate 26 tightly down against the cutting tool 22 to hold the latter in any position in which it may be adjusted by the adjusting screw 25.

The slot 21 and the cutting tool 22 are in a plane parallel to and offset from the axis of the operating shaft 10 and guide stem 12, so that the tool 22 is not radial in the cutter head but is at a considerable oblique angle to the cutter-head radius through the cutting edge, with the rear or inner end of the slot 21 and tool 22 ahead of that radius in the direction of rotation, as is clear from Fig. 2. As a result, because of the taper of the outer surface of the cutter head, the lower end of the cutting edge 23 is farther angularly advanced circumferentially in the direction of rotation than is the upper end of said cutting edge. This gives an undercutting action, tending to draw the cutter head downward into the valve seat which is being reamed, thus at the same time both preventing chattering and relieving the operator of the necessity of exerting great endwise pressure on the operating shaft 10; for because the lower end of the cutting edge is advanced angularly farther than the upper edge of said edge the reaction on the cutting edge tends to force the cutter downward into the work. This greatly increases the ease of operation of the tool and gives a smoother surface on the valve seat.

In operation, the proper valve stem 12 and proper cutter head 11 are chosen for the valve seat to be reamed, if these parts are interchangeable; and the tool assembled as shown in Fig. 4. Then the assembled tool, whether of the type shown in Fig. 4 or of the type shown in Fig. 5, is placed in proper cooperation with the valve seat 30 to be reamed, with the guide stem 12 projecting into the hole 31 which normally receives the stem of the valve associated with such valve seat. Then, the cross bar 16 being in place, the whole device is rotated by hand, or by any suitable driving mechanism attached to the square upper end 32 of the operating shaft 10, to cause the cutting edge 23 to travel around the valve seat and redress the valve-seat surface. The depth of cut, or the thickness of material removed at one passage of the cutting tool, is determined by adjusting the screw 25; and is limited by the projection of the cutting tool beyond the circle of the head 11 or 11', by the engagement of such head near such tool with the valve seat. As the operation is exceedingly simple and as chattering is avoided and it is not necessary to exert great endwise pressure onto the tool to feed it into the work, the redressing of the valve seat may be done with great rapidity; and because of the smoothness of the cutting obtained by reason of the absence of chattering very little grinding-in of the valve in the valve seat is necessary after the surface has been redressed with the reamer.

I claim as my invention:

1. A valve-seat reamer, comprising an operating member, a guide stem removably attached thereto, and a cutter head removably attached in fixed axial position to said operating member and guide stem, said cutter head having a non-cutting portion adapted to bear against the valve-seat and limit the depth of the cut.

2. A valve-seat reamer, comprising an operating shaft, a guide stem alined with said shaft and attachable thereto and detachable therefrom, and a cutter head removably mounted in fixed axial position on said shaft and stem at the joint between them, said cutter head having a non-cutting portion adapted to bear against the valve-seat and limit the depth of the cut.

3. A valve-seat reamer, comprising an operating shaft, a guide stem alined with said shaft and attachable thereto and detachable therefrom, and a cutter head removably mounted in fixed axial position on said shaft and stem, said cutter head having a non-cutting portion adapted to bear against the valve-seat and limit the depth of the cut.

4. A valve-seat reamer, comprising an operating shaft, a guide stem alined with and having a screw connection with the end of said operating shaft, and a cutter head removably clampable in fixed axial position between said shaft and stem by said screw connection, said cutter head having a non-cutting portion adapted to bear against the valve-seat and limit the depth of the cut.

5. A valve-seat reamer, comprising a tapered cutter head, means for rotating said cutter head, said cutter head being provided with a slot opening on the periphery and on the larger end face thereof, a cutting tool mounted in said slot, an adjusting screw mounted in said cutter head and cooperating with said tool to feed the latter outward and take any inward thrust therefrom, and a clamping bar extending across said slot opening on the larger end face of said slot for clamping the cutting tool in said slot.

6. A valve-seat reamer, comprising a tapered cutter head, means for rotating said cutter head, said cutter head being provided with a slot opening on the periphery thereof, a cutting tool mounted in said slot, and an adjusting screw mounted in said cutter head and cooperating with said tool to feed the latter outward and take any inward thrust therefrom.

7. A valve-seat reamer, comprising a tapered cutter head, means for rotating said cutter head, said cutter head being provided with a slot opening on the periphery thereof, a cutting tool mounted in said slot, and an adjusting screw mounted in said cutter head and cooperating with said tool to feed the latter outward and take any inward thrust therefrom, said screw being transverse to the said tool, and said tool having a surface which is engaged by the screw head and is oblique to the screw axis.

8. A valve-seat reamer, comprising a tapered cutter head, means for rotating said cutter head, said cutter head being provided with a single slot opening on the periphery thereof, and a cutting tool mounted in said slot, said slot and tool being oblique to the cutter-head radius through the outer end of said slot and tool and having the rear or inner end of said slot and tool ahead of said radius in the direction of cutter-head rotation during operation.

9. A valve-seat reamer, comprising a rotatable carrying member, and a single cutting tool carried thereby and projecting from the periphery thereof, one end of the cutting edge of said cutting tool being of greater distance from the axis of rotation than the other and also being materially angularly rearward thereof with respect to the direction of rotation.

10. A valve-seat reamer, comprising a tapered cutter head, means for rotating said cutter head, said cutter head being provided with a single slot opening on the periphery thereof, and a cutting tool mounted in said slot, said slot and tool being in a plane parallel to and offset from the axis of rotation of the cutter head having the rear end of said cutting tool and slot materially ahead of the cutting end thereof with respect the direction of rotation.

11. A device for facing automobile valve seats and the like, comprising a stem adapted to enter into the guide for the valve stem, a body adapted to be clamped in fixed axial position, said body being tapered in accordance with the taper of the valve seat and adapted to be seated in contact therewith, and a single cutting edge arranged in the tapered face of said body and a member on said stem for manual turning of said valve seat grinding member.

12. A valve seat reamer, comprising a cutter head adapted to be seated in contact with the valve seat, means for rotating said cutter head, and a cutting tool adjustably mounted in said cutter head, said cutting tool being so disposed that that end of its cutting edge lying nearest the axis of said cutter head has an angular advance over the other end of said cutting edge in the direction of rotation.

13. A valve seat reamer, comprising a cutter head adapted to be seated in contact with the valve seat, means for rotating said cutter head, and a cutting tool mounted in said cutter head, said cutting tool being so disposed that that end of its cutting edge lying nearest the axis of said cutter head has an angular advance over the other end of said cutting edge in the direction of rotation.

In witness whereof, I have hereunto set my hand at Indianapolis, Indiana.

ALBERT C. SAVIDGE.